United States Patent
Kung

(10) Patent No.: US 8,443,215 B2
(45) Date of Patent: May 14, 2013

(54) POWER BOOSTER AND ELECTRONIC SYSTEM USING SAME

(75) Inventor: Fan-Chin Kung, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 355 days.

(21) Appl. No.: 12/916,621

(22) Filed: Oct. 31, 2010

(65) Prior Publication Data

US 2012/0054504 A1 Mar. 1, 2012

(30) Foreign Application Priority Data

Aug. 24, 2010 (TW) ................................ 99128340 A

(51) Int. Cl.
- *G06F 1/00* (2006.01)
- *H02J 7/00* (2006.01)
- *H02J 7/04* (2006.01)

(52) U.S. Cl.
USPC ............ 713/300; 320/128; 320/137; 320/149

(58) Field of Classification Search .................. 713/300; 320/128, 137, 149
See application file for complete search history.

(56) References Cited

U.S. PATENT DOCUMENTS

| | | | |
|---|---|---|---|
| 5,835,366 A * | 11/1998 | Pleso et al. ...................... | 363/59 |
| 6,211,649 B1 * | 4/2001 | Matsuda ....................... | 320/115 |
| 2001/0020802 A1 * | 9/2001 | Kitagawa et al. ............... | 307/66 |
| 2006/0166043 A1 * | 7/2006 | Eom et al. .......................... | 429/7 |
| 2007/0120531 A1 * | 5/2007 | Huh .............................. | 320/130 |
| 2007/0273326 A1 * | 11/2007 | Krieger et al. ................ | 320/110 |
| 2010/0133908 A1 * | 6/2010 | Weng ............................... | 307/48 |
| 2010/0277125 A1 * | 11/2010 | Ferguson ...................... | 320/128 |

* cited by examiner

*Primary Examiner* — Vincent Tran
(74) *Attorney, Agent, or Firm* — Altis Law Group, Inc.

(57) ABSTRACT

A power booster includes a voltage detection circuit, a battery charger, a rechargeable battery, and a transformer circuit. The voltage detection circuit detects a voltage of the input voltage of the power booster. An input of the battery charger is electrically connected to an output of the voltage detection circuit. The rechargeable battery includes an I/O port electrically connected to the battery charger. The transformer circuit includes a first voltage input, a second voltage input, and a voltage output. The first voltage input is electrically connected to the output of the voltage detection circuit. The second voltage input is electrically connected to the I/O port. The voltage output is used for connecting to a mobile electronic device.

5 Claims, 1 Drawing Sheet

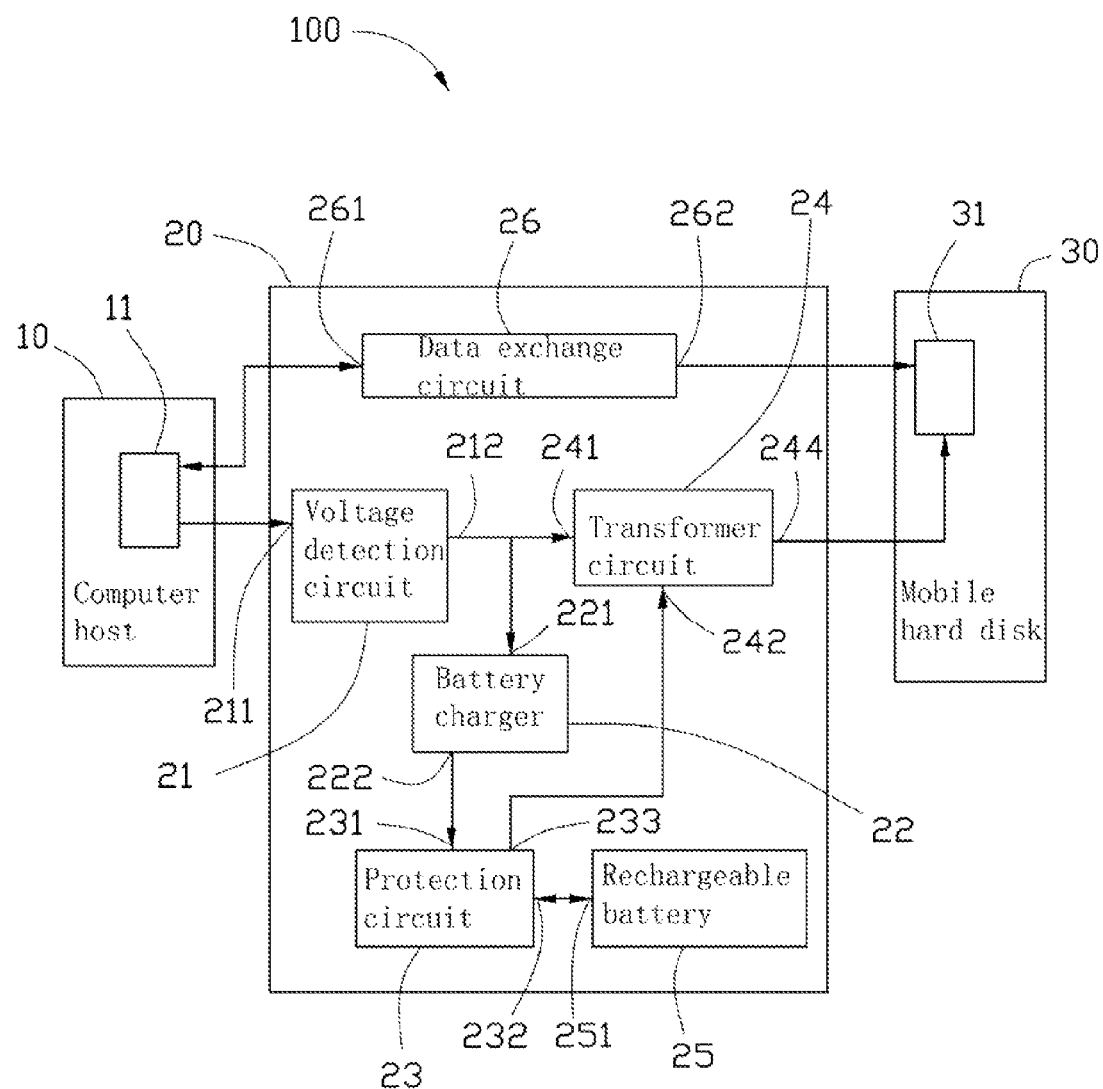

POWER BOOSTER AND ELECTRONIC SYSTEM USING SAME

BACKGROUND

1. Technical Field

The disclosure relates to a power booster and an electronic system using the same.

2. Description of Related Art

Mobile hard disks are usually connected to USB interfaces of computer hosts by data lines to exchange data. When the mobile hard disks boot up, motor drivers of the mobile hard disks need a large current in short-term. However, it is not uncommon that the current provided by the computer hosts to the USB interfaces is insufficient. In this case, the computer hosts will cut off the power supply to the USB interfaces, which may cause data loss or/and damage the mobile hard disks.

Therefore, it is desirable to provide a power booster and an electronic system using the same which can overcome the above problems.

BRIEF DESCRIPTION OF THE DRAWING

Many aspects of the present disclosure can be better understood with reference to the drawing. The components in the drawing are not necessarily drawn to scale, the emphasis instead being placed upon clearly illustrating the principles of the present disclosure.

The drawing is a schematic view of an electronic system in accordance with an exemplary embodiment.

DETAILED DESCRIPTION

Embodiments of the present disclosure will now be described in detail below and with reference to the drawing.

Referring to the drawing, an electronic system 100, according to an exemplary embodiment, includes a computer host 10 including a first USB interface 11, a mobile electronic device 30, and a power booster 20 electrically interconnected between the computer host 10 and the mobile electronic device 30 for providing a boosted power boosted by the power booster 20 to the mobile electronic device 30. In the present embodiment, the mobile electronic device 30 is a mobile hard disk and includes a second USB interface 31.

The power booster 20 includes a voltage detection circuit 21, a battery charger 22, a protection circuit 23, a transformer circuit 24, a rechargeable battery 25, and a data exchange circuit 26.

The voltage detection circuit 21 includes an input 211 and an output 212. The input 211 is connected to the first USB interface 111 of the computer host 10. The voltage detection circuit 21 detects a voltage value of the first USB interface 11.

The battery charger 22 includes an input 221 and an output 222. The input 221 is electrically connected to the output 212 of the voltage detection circuit 21.

The protection circuit 23 includes a first input 231, an I/O port 232, and an output 233. The first input 231 is electrically connected to the output 222 of the battery charger 22. The protection circuit 23 prevents the battery charger 22 from overcharging the rechargeable battery 25 and prevents the rechargeable battery 25 from over-discharging.

In the present embodiment, the transformer circuit 24 is a voltage converter, which includes a first voltage input 241, a second voltage input 242, and a voltage output 244. The first voltage input 241 is electrically connected to the output 212 of the voltage detection circuit 21. The second voltage input 242 is electrically connected to the output 233 of the protection circuit 23. The voltage output 244 is electrically connected to the second USB interface 31 of the mobile hard disk 30. The transformer circuit 24 transmits the input voltage of the first voltage input 241 or boosts the input voltage of the second voltage input 242 into the maximum rated voltage of the mobile hard disk 30 to the mobile hard disk 30 by the voltage output 244. In the present embodiment, the maximum rated voltage of the mobile hard disk 30 is 5 volts (V), the corresponding maximum rated voltage is 0.5 amps (A).

The rechargeable battery 25 includes a first I/O port 251 electrically connected to the I/O port 232 of the protection circuit 23. The rechargeable battery 25 stores electric quantity output by the battery charger 22 and outputs a 3-4.2 V supply power.

The data exchange circuit 26 includes a first data exchange port 261 and a second data exchange port 262. The first data exchange port 261 is electrically connected to the first USB interface 11 of the computer host 10. The second data exchange port 262 is electrically connected to the second USB interface 31 of the mobile hard disk 30. The data exchange circuit 26 exchanges data between the computer host 10 and the mobile hard disk 30.

It should be noted that the protection circuit 23 can be omitted, and the output 222 of the battery charger 22 is directly and electrically connected to the first I/O port 251 of the rechargeable battery 25. The first I/O port 251 of the rechargeable battery 25 is also electrically connected to the second voltage output 242 of the transformer circuit 24.

In use, first, the power booster 20 is electrically connected to the first USB interface 11 of the computer host 10. Subsequently, the mobile hard disk 30 is electrically connected to the power booster 20. During the data exchanging process, when the voltage detection circuit 21 detects that the output voltage of the first USB interface 11 of the computer host 10 is smaller than the working voltage of the mobile hard disk 30. In other words, the mobile hard disk 30 cannot gain sufficient current from the first USB interface 11 of the computer host 10, the computer host 10 automatically cuts off power supply to the mobile hard disk 30. At the same time, the rechargeable battery 25 outputs a 3V-4.2V power supply to the transformer circuit 24. In the present embodiment, because the maximum rated voltage of the mobile hard disk 30 is 5V. The transformer circuit 24 boosts the output voltage of rechargeable battery 25 of 3V-4.2V into the maximum rated voltage of the mobile hard disk 30 of 5V to the mobile hard disk 30 to prevent from causing data loss between the computer host 10 and the mobile hard disk 30.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. An electronic system comprising:
a computer host comprising a first USB interface;
a mobile electronic device comprising a second USB interface; and
a power booster electrically connected to the computer host for providing a boosted power boosted by the power booster to the mobile electronic device, the power booster comprising:
a voltage detection circuit, a battery charger, a rechargeable battery, and a transformer circuit, the voltage detection circuit is configured for detecting an output voltage of the first USB interface, the battery charger comprises an input and an output, the input of the battery charger is electrically connected to an output of the voltage detection circuit, the rechargeable battery comprises a first I/O port electrically connected to the output of the battery charger, the rechargeable battery is configured for storing electric quantity output by the battery charger, the transformer circuit comprises a first voltage input, a second voltage input, and a voltage output, the first voltage input is electrically connected to the output of the voltage detection circuit, the second voltage input is electrically connected to the first I/O port of the rechargeable battery, the voltage output is electrically connected to the mobile electronic device, wherein when the voltage detection circuit detects that the output voltage of the first USB interface is smaller than the working voltage of the mobile electronic device, the computer host automatically cuts off power to the mobile electronic device, the rechargeable battery outputs a power supply having an output voltage to the transformer circuit, the transformer circuit boosts the output voltage of the power supply from the rechargeable battery to the maximum rated voltage of the mobile electronic device, the power booster further comprises a data exchange circuit for exchanging data between the mobile electronic device and the computer host, the data exchange circuit comprises a first data exchange port and a second data exchange port, the first data exchange port is electrically connected to the first USB interface of the computer host, the second data exchange port is electrically connected to the second USB interface of the mobile electronic device.

2. The electronic system of claim 1, wherein the power booster further comprises a protection circuit, the protection circuit is interconnected between the battery charger and the rechargeable battery, the protection circuit is configured for preventing the battery charger from overcharging the rechargeable battery and preventing the rechargeable battery from over-discharging.

3. The electronic system of claim 2, wherein the protection circuit comprises an input, a second I/O port, and an output, the input of the protection circuit is electrically connected to the output of the battery charger, the second I/O port is electrically connected to the first I/O port of the rechargeable battery, the output of the protection circuit is electrically connected to the second voltage input of the transformer circuit.

4. The electronic system of claim 1, wherein the transformer circuit is a voltage converter.

5. The electronic system of claim 1, wherein the mobile electronic device is a mobile hard disk.

* * * * *